Oct. 14, 1952     R. A. CARLSON     2,613,777
COMBINATION SPRING-LOADED AND OVERCENTER CLUTCH
Filed July 14, 1948     2 SHEETS—SHEET 2

Inventor:
Raymond A. Carlson

Patented Oct. 14, 1952

2,613,777

UNITED STATES PATENT OFFICE 2,613,777

COMBINATION SPRING-LOADED AND OVERCENTER CLUTCH

Raymond A. Carlson, Rockford, Ill., assignor to Borg-Warner Corporation, Chicago, Ill., a corporation of Illinois Application July 14, 1948, Serial No. 38,685

13 Claims. (Cl. 192—48)

The present invention relates primarily to double clutches of the friction type, and it has particular reference to an over-center actuating mechanism for operating one of such clutches.

One of the objects of the improvements is to provide, in a double friction clutch assembly a releasable spring loaded clutch assembly and a novel over-center operating mechanism for the second clutch assembly to effect a power take-off for suitable auxiliary driven devices.

Another object hereof is to provide an over-center clutch operating mechanism which is arranged exterior to the double clutch housing or cover structure for permitting ready access to such mechanism.

Also it is an object to provide an adjustable stop-ring arranged in association with an over-center mechanism for selectively rendering said mechanism operative or inoperative with respect to the clutch assembly. Cooperating with such ring is an effective latching arrangement which is not disturbed by centrifugal forces created by rotational movement of the clutch assembly.

Further, it is an object hereof to provide a double clutch assembly wherein one assembly is engaged by means of coiled packing springs and the other assembly is selectively engaged or released by a novel over-center operating mechanism. In this connection, both clutches are adapted to be released by movement of respective thrust collars operating in one and the same direction.

Additional objects, aims, and advantages of the improvements contemplated herein will be apparent to persons skilled in the art after the construction and operation of the clutch arrangement is understood from the within description. It is preferred to accomplish the numerous objects of this invention, and to practice the same in substantially the manner hereinafter fully described and as more particularly pointed out in the claims. Reference is now made to the accompanying drawings that form a part of this specification.

In the drawings:

Fig. 4 is a fragmentary view showing the relative positions of the parts of the over-center mechanism when the clutch is released.

The drawings are to be understood as being more or less of a diagrammatic character for the purpose of disclosing a typical or preferred form of improvements contemplated herein, and in these drawings like reference characters identify the same parts in different views.

Figure 1:
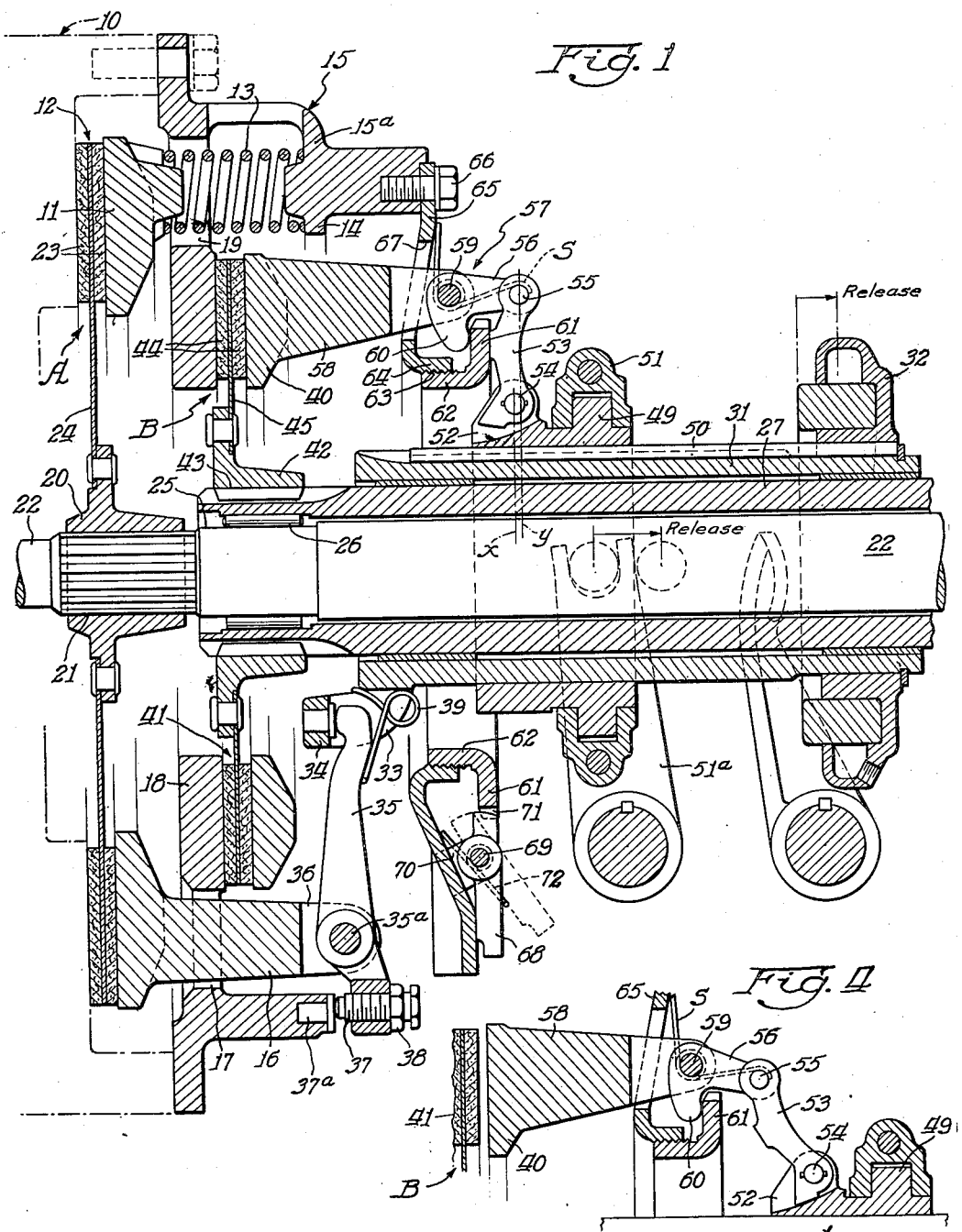
Fig. 1 is an axial sectional view of a clutch arrangement embodying the invention contemplated herein.

The embodiment of the improvements which has been selected for this disclosure comprises an arrangement adaptable for use in a motor vehicle, such arrangement including two clutch assemblies, designated generally as A and B, that are adapted to be operatively coupled to a driving member 10 which may be the flywheel of the vehicle engine. One of the clutches is adapted to couple the engine crank-shaft to the transmission shaft for driving the vehicle, and the other clutch (preferably the over-center clutch) is adapted to couple the engine crank-shaft to an output shaft for driving an accessory either on the vehicle or remote thereto.

The clutch assembly A comprises an annular pressure plate 11 and a driven plate or disc 12 adapted to be frictionally engaged between the driving member 10 and the pressure plate 11 by coiled springs 13 which are interposed between pressure plate 11 and an annular internal flange 14 on the cylindrical wall 15a of a clutch cover or housing 15 that is anchored to the flywheel 10 for rotation therewith. The springs 13 thus furnish the pressure for engagement of the components of the clutch assembly A. Torque is transmitted from flywheel 10 to pressure plate 11 through the medium of lateral lugs 16 projecting from said plate through slots 17 in an annular wall 18 extending radially inward from the housing wall 15a. Thus, a positive driving connection is effected between the driving member or flywheel 10 and the clutch pressure plate 11. The annular wall 18 also constitutes the back plate member of the second clutch assembly B, and since it is located between the pressure plate 11 and the spring seating flange 14, it has holes 19 to accommodate the packing springs 13.

The driven plate or disc 12 includes a hub 20 splined at 21 on a driven shaft 22, and said disc has a pair of friction facings 23 which are carried by the hub 20 through the medium of the radially extending plate 24 anchored to the hub. The facings 23 are secured on opposite sides of the radially outer portion of the plate 24 so that they lie between the confronting surfaces of the pressure plate 11 and the flywheel 10.

Beyond and rearwardly of its splines the driven shaft 22 has a shouldered region 25 to receive anti-friction devices 26 for rotatably journaling a take-off or second driven shaft 27 which has tubular cross section so that it is telescoped on shaft 22 for rotative movement with said shaft or independently thereof. Driven shaft 22 is coupled preferably to the transmission shaft for driving the vehicle, and shaft 27 defines an output shaft for driving auxiliary devices either on or adjacent the vehicle.

An elongated clutch release sleeve 31 is slidably reciprocated on the outer tubular shaft 27 by an actuator or thrust bearing 32. At its end nearest the clutch assembly A, this release sleeve 31 has axially projecting L-shaped lugs 33 the lateral arms 34 of which are engaged with the radially inner portions of the release levers 35 that have their radially outer regions swingably carried by pivot pins 35a extending between pairs of ears 36 on the torque transmitting or driving lugs 16 of the pressure plate 11. As seen in Fig. 1, these release levers 35 are at the side of annular wall member 18 rearward from the clutch assembly A as well as beyond clutch assembly B. The portions of release levers 35 which project radially outward from their pivots 35a have transverse bolts 37 screwed into them and secured in place by lock nuts 38. The projecting shanks of bolts 37 are engaged with headed plugs 37a on the adjacent portions of housing 15. Thus the bolts 37 provide adjustable fulcrums for the release levers. When the radially inner ends of levers 35 are swung on their pivots 35a to the right (Fig. 1) their fulcrums 37 will force the pressure plate 11 rearwardly in opposition to the action of springs 13, and will release the clutch members of the assembly A. Suitably shaped spring devices 39, carried by release collar 31, press against the radially inner portions of levers 35 to urge them into engagement with the lugs 33 to insure constant contact between the levers and the collar lugs 33, and to prevent rattle.

Figure 3:
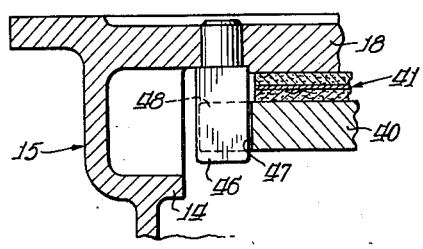
Fig. 3 is a transverse section along the plane of line 3—3 on Fig. 2.

The clutch assembly B comprises the annular wall 18, functioning as a back plate, an annular pressure plate 40, and a driven clutch disc 41. This driven disc 41 includes a hub 42 splined at 43 on the adjacent end portion of tubular driven shaft 27 and a pair of friction facings 44 supported by the hub 42 through the medium of the clutch plate 45 secured to said hub. The facings 44 are attached to the peripheral region of the clutch disc 45 so that they lie between the confronting surfaces of back plate 18 and pressure plate 40. A driving connection between pressure plate 40 and the driving member or flywheel 10 is effected by means of the structure shown in detail in Fig. 3, such structure comprising driving studs 46 anchored in the annular wall or back plate 18 so that they project axially rearward into recesses 47 in bosses 48 extending radially from the outer edge of pressure plate 40.

A thrust bearing or release collar 49 for clutch assembly B is keyed at 50 on the sleeve 31 for rotation therewith and also for longitudinal sliding movement thereon when such bearing or collar 49 is shifted by an actuator or rockable fork 51a. At its end nearest the pressure plate 40 release collar 49 has bifurcated lugs 52 in which the radially inner ends of toggle links 53 are pivotally carried on pins 54 which are engaged in said lugs. The radially outer ends of these links 53 have movable connection, by means of pivot pins 55, with the horizontally arranged long arms 56 of pairs of spaced bell-cranks or cam devices 57. The spaced angular portions of these bell-cranks or cams 57 are positioned upon the sides of elongate ears 58 projecting axially from the rear pressure plate 40 and said bell-cranks or cams are fulcrumed on pivot pins 59 carried by said ears. The short arms 60 of the bell-cranks or cams incline somewhat rearwardly to engage the radial flange 61 of an axially adjustable stop-ring 62 which is of L-shape cross-section and is supported by housing 15. It will be seen that the axis $x$ of pivot pin 54 is offset forwardly of the axis $y$ of pivot pin 55 when the rear or power take-off clutch assembly B is engaged as shown in Fig. 1. This offsetting of the pivots is sufficient to effect a lock-up of clutch B when such clutch is in use to drive an auxiliary mechanism and the like. The links 53 and bell-crank arms 56 define a toggle structure which connects release collar 49 to the pressure plate 40, and the bell-crank arms 60 define cam means for engaging stop-ring flange 61. By shifting such collar rearwardly to the right the toggle structures will tend to straighten as shown in Fig. 4, thereby to withdraw the pressure plate 40 from the driven friction plate 41 and thus uncouple the members of the power take-up clutch B. It is apparent that this clutch assembly B and the tubular shaft 27 driven thereby are adapted for operation independently of the other clutch assembly A and its driven shaft 22, thus permitting a selective operation of the two clutch assemblies.

The stop-ring 62 has external threads 63 on its cylindrical flange portion that extends forwardly, which threads screw into the internally threaded cylindrical portion of flange 64 to a carrier bracket 65 having attachment to a convenient portion of the rear end of the cover or housing 15, as by bolts 66. As best seen in Fig. 1, the carrier bracket has apertures 67 in its slightly inclined radial portion so that the lugs 58 of pressure plate 40 pass therethrough to project beyond the plane of the bracket. Thus, the toggle and collar assembly 57, as well as the stop-ring flanges 61 and 62 are positioned outside the confines of the housing and the carrier bracket where the component parts are convenient for access. Springs S have their end portions engaged respectively with the carrier bracket 65 and the pivot pin 55 of the actuator link, and the intermediate regions of these springs surround the pivot pin 59 of the bell-crank. This spring arrangement prevents chatter between the component parts of the toggle structure, and said springs also press the hinging region of the toggle radially inward during the operation which releases the clutch B.

Figure 2:
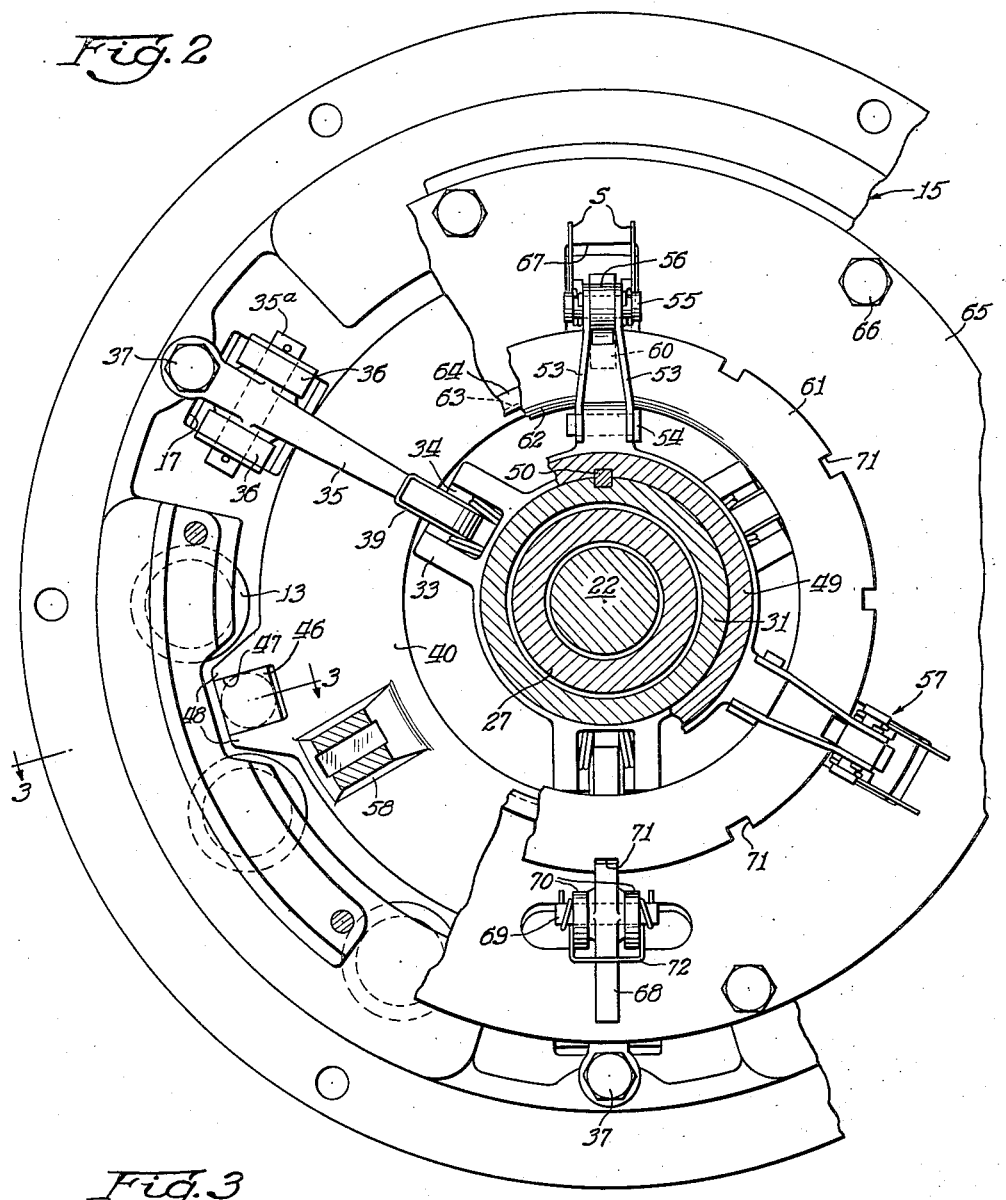
Fig. 2 is a fragmentary elevational view, partly broken away, of the assembly shown in Fig. 1.

As before stated, the stop-ring 62 is adjustable by rotating the same in a direction to move it into or reversely with respect to the carrier bracket. Suitable locking means are provided to maintain the stop-ring in various adjusted positions. This lock means preferably takes the form of an elongated latch bar 68 mounted on a pivot pin 69 extending between ears 70 on a convenient portion of the carrier bracket 65. The latch bar 68 is radially positioned with its major portion lying radially outward from its pivot 69 and while the shorter portion of said latch bar is engageable in notches or seats 71 in the periphery of the stop-ring flange 61. The construction and arrangement of the locking mechanism is such that centrifugal forces created by the rotating clutch assembly will maintain the latch bar in engagement with the notch 71 in the stop-ring flange. Also, the locking arrangement may be maintained in normal position by the U-shaped spring device 72, as shown in Fig. 2. The adjustable character of the stop-ring is effective to vary the relationship between said ring and the clutch operating assembly 57. Also, it will be apparent that the stop-ring may be shifted rearwardly a sufficient distance so that the bell-crank arm 60 will not be able to engage the stop-ring flange 61 when the shifter collar 49 is operated, thus rendering the second or rear clutch assembly B inoperative.

While this invention has been disclosed in detail in its present preferred form or embodiment, it will be apparent to persons skilled in the art, after understanding the improvements, that various changes and modifications may be made therein without departing from the spirit or scope thereof. It is aimed in the pending claims to cover all such changes and modifications.

What is claimed is:

1. A multiple clutch arrangement comprising, a spring-loaded friction clutch assembly including a flywheel and being normally biased against said flywheel; means for selectively effecting release of said spring-loaded assembly; a normally disengaged friction clutch assembly of the over-center type arranged rearward of said spring-loaded clutch assembly and independent thereof; a cover supported on and driven by said flywheel and having an internal radial wall defining a fixed back plate for said over-center clutch assembly, said back plate being spaced rearwardly of said spring-loaded assembly, said cover encompassing both said clutch assemblies and having a radially inward extending rear wall and a driving connection with a member of said spring-loaded clutch assembly; a stop-ring of L-shape cross section having its axial flange attached to said rear wall; and means for operating said over-center clutch assembly comprising, a post projecting through said rear wall from a member of said over-center clutch assembly; a bell-crank pivoted on the outer rear end of said post, one arm of said bell-crank being operable against the radial flange of said stop-ring; a reciprocable shift collar; and a link pivoted at one end on said shift collar and having its outer end hingedly connected to said bell-crank, the movement of said collar in a forward direction being adapted to effect locked engagement of said over-center clutch assembly.

2. A multiple clutch arrangement comprising, a spring-loaded friction clutch assembly including a flywheel and being normally biased against said flywheel; means for selectively effecting release of said spring-loaded assembly; a normally disengaged friction clutch assembly of the over-center type arranged rearward of said spring-loaded clutch assembly and independent thereof and including a pressure plate; a cover supported on and driven by said flywheel and having an internal radial wall defining a fixed back plate for said over-center clutch assembly and a driving connection with a member of said spring-loaded clutch assembly, said cover housing both said clutch assemblies and having a radially inward extending rear wall; said fixed back plate being spaced rearward from said spring-loaded clutch assembly; a stop-ring of L-shape cross section having its axial flange attached to said rear wall; and means exterior to said cover for operating said over-center clutch assembly comprising, a post extending rearward from said pressure plate and projecting through said rear wall; a bell-crank pivoted on the projecting end of said post, one arm of said bell-crank being operable against the radial flange of said stop-ring; a reciprocable shift collar; and a link pivoted at one end on said shift collar and having its other end hingedly connected to another arm of said bell-crank, the movement of said collar in a forward direction being adapted to effect locked engagement of said over-center clutch assembly.

3. A multiple clutch arrangement comprising, a spring-loaded friction clutch assembly including a flywheel and being normally biased against said flywheel; means for selectively effecting release of said spring-loaded assembly; a normally disengaged friction clutch assembly of the over-center type arranged rearward of said spring-loaded clutch assembly and independent thereof and including a pressure plate; a cover supported on and driven by said flywheel and having an internal radial wall defining a fixed back plate for said over-center clutch assembly with a driving connection with a member of said spring-loaded clutch assembly, said cover housing both said clutch assemblies and having a radially inward extending rear wall; said fixed back plate being spaced rearward from said spring-loaded clutch assembly; a stop-ring of L-shape cross section having its axial flange adjustably attached to said rear wall; and means exterior to said cover and rearward of said rear wall for operating said over-center clutch assembly comprising, a post extending rearward from said pressure plate and projecting through said rear wall; a bell-crank pivoted on the outer rear end of said post, an arm of said bell-crank being operable against the radial flange of said stop-ring; a reciprocable shift collar; link means operatively connecting said bell-crank to said shift collar, the movement of said collar in a forward direction being adapted to effect locked engagement of said over-center clutch assembly; and means for locking said stop-ring in a selected position of adjustment to effect the inoperativeness of said over-center clutch assembly.

4. A clutch arrangement comprising, a flywheel; a clutch cover drivingly connected with said flywheel and having a cylindrical rear portion extending axially from said flywheel; a normally disengaged friction clutch assembly having a pressure plate within said cover; a fixed back plate between said pressure plate and said flywheel and driven by said cover; radially positioned bracket means carried by said cover and spaced rearward of said pressure plate; and means exterior to said cover and rearward of said bracket means for operating said clutch assembly comprising a stop-ring of L-section arranged with its radial flange rearward of said bracket means and having its axial flange in axially adjustable engagement with said bracket means; cam means supported by said pressure plate adjacent said radial flange for engagement therewith; and actuating means operable to move said cam means to one position for moving said pressure plate to effect clutch engagement, said means also being adapted to move said cam means to another position for moving said pressure plate to release said clutch assembly; the axial adjustment of said stop-ring in a direction away from said clutch assembly being effective to prevent engagement of said cam means with said radial flange of the stop-ring.

5. An over-center clutch assembly comprising, a driving member; an axially shiftable pressure plate; a driven friction disc adapted to be packed between said driving member and said pressure plate; a driven shaft supporting said friction disc; a clutch cover housing said driving member, friction disc, and pressure plate; a carrier extending radially inward from said cover; a support extending rearward from said pressure plate with its end region projecting through said carrier and defining a driving connection between said driving member and the pressure plate; abutment means on said carrier adjacent said support end region and exterior to said cover; cam means carried by said support end region for cooperation with said abutment means; a release collar movable axially on said driven shaft; and means defining an over-center connection between said collar and said cam means, whereby movement of said collar in one direction is adapted to effect movement of said cam means against said abutment for effecting locked engagement of said clutch assembly.

6. An over-center clutch assembly as defined in claim 5 wherein the cam means comprises a bell-crank pivotally mounted on said support end region, and said release collar has a pivoted link connection with an arm of said bell-crank.

7. In a friction clutch, a first driven plate; a flywheel and a first pressure plate between which said driven plate is adapted to be engaged; an annular back plate in axially spaced relation to said first pressure plate; a second pressure plate alongside said back plate; a second driven plate between said back plate and second pressure plate for engagement therewith; spring means normally urging said first pressure plate in a direction to engage said first driven clutch plate against said flywheel; a clutch housing attached to and driven by said flywheel, said back plate being secured to said housing and lying between said first and second pressure plates; the respective pressure plates being drivingly connected to said flywheel; and means for selectively operating the respective pressure plates, the means operating said second pressure plate comprising bracket means extending radially inward from said housing, abutment means spaced rearward from said bracket means, cam means adapted for engagement with said abutment means and arranged between said bracket means and said abutment means, an axially movable thrust bearing, and over-center linkage connecting said thrust bearing to said cam means, said linkage arranged in bridging relation to said abutment means and rearward from said bracket means for effecting locked engagement of said second clutch assembly.

8. In a friction clutch, a first driven clutch plate; a flywheel and a first pressure plate between which said driven plate is adapted to be engaged; spring means normally urging said first pressure plate in a direction to engage said first driven clutch plate against said flywheel; an annular back plate in axially spaced relation to said first pressure plate; a second pressure plate alongside said back plate; a second driven clutch plate between said back plate and second pressure plate for engagement therewith; a clutch housing attached to and driven by said flywheel, said back plate being secured to said housing and lying between said first and second pressure plates; the respective pressure plates having driving connection with said flywheel; and means for selectively operating the respective first and second pressure plates, the means for operating said second pressure plate comprising radially extending annular bracket means carried by said housing rearwardly of said second pressure plate, supports projecting rearward from said second pressure plate with end regions protruding through said bracket means, bell-cranks pivoted on the protruding rear end regions of said supports and having force applying arms and operating arms, annular stop means rearward of said bracket means and coacting with the work arms of said bell-cranks, a thrust collar, and linkage connecting said operating arms to said thrust collar, said linkage and bell-cranks defining over-center assemblies for effecting locked engagement of the second pressure plate and second driven plate.

9. In a friction clutch, a first driven clutch plate; a flywheel and a first pressure plate between which said driven plate is adapted to be engaged; spring means normally urging said first pressure plate in a direction to engage said first driven clutch plate against said flywheel; an annular back plate in axially spaced relation to said first pressure plate; a second pressure plate alongside said back plate; a second driven clutch plate between said back plate and second pressure plate for engagement therewith; a clutch housing attached to and driven by said flywheel, said back plate being secured to said housing and lying between said first and second pressure plates; the respective pressure plates having driving connection with said flywheel; and means for selectively operating the respective first and second pressure plates, the means for operating said second pressure plate comprising radially extending annular support means extending radially inward from said housing with a portion defining an abutment spaced rearward from said support means, a post protruding through said support means from said second pressure plate with its end adjacent said abutment, a bell-crank pivoted on the protruding end region of said post rearward of said support means, and having a force applying cam arm and an operating arm, said force applying cam arm acting on said abutment; a thrust collar; and linkage connecting said operating arm to said thrust collar, said linkage and bell-crank defining an over-center assembly for effecting locked engagement of the second pressure plate and second driven plate.

10. A multiple friction clutch arrangement comprising a flywheel; a spring biased friction clutch assembly normally engaged with said flywheel; release means for disengaging said clutch assembly; a normally disengaged second friction clutch assembly comprising driven members one of which has driving connection with said flywheel; a cover attached to said flywheel for housing both said clutch assemblies; and means independent of said release means for effecting engagement of said second clutch assembly and including wall means extending radially inward from said cover with a portion defining an abutment spaced rearward of said wall means; a post protruding through said wall means from a member of said second clutch assembly with its end adjacent said abutment; cam means fulcrumed on the protruding portion of said post; and a release collar adapted for movement in a direction to effect a rocking of said cam means to engage said abutment and thereby effect locked engagement of said second clutch assembly.

11. A multiple friction clutch arrangement comprising a flywheel; a spring biased friction clutch assembly normally engaged with said flywheel; release means for disengaging said clutch assembly; a normally disengaged second friction clutch assembly comprising driven members spaced rearward from said first clutch assembly; wall means interposed between said clutch assemblies providing driving connections with said flywheel; a cover attached to said flywheel for housing both said clutch assemblies; and means independent of said release means for effecting engagement of said second clutch assembly and including bracket means extending radially inward from said cover with a portion defining an abutment spaced rearward from said bracket means, cam means fulcrumed on a rearward portion of a member of said second clutch assembly, said cam means having an axial arm and a radial arm, a release collar, and a link pivotally connected at its ends respectively to said release collar and said axial arm of the cam means, said release collar being adapted for movement in a direction to rock said cam means to operate against said abutment and thereby to engage and lock said second clutch assembly.

12. A multiple clutch arrangement comprising a drive member; telescoped driven members; a normally engaged first friction clutch assembly and a normally disengaged second friction clutch assembly, said assemblies each having driving connection with said drive member and being adapted to drivingly connect said drive member to the respective driven members; means for effecting release of said first friction clutch assembly; cam means independent of said release means of said first clutch assembly and operable to effect engagement and disengagement of the friction members of said second clutch; abutment means carried by said drive member and normally engageable by said cam means for operating said second clutch assembly; said cam means having a rearwardly extending axial arm; linkage including an over-center coupling, the operation of said linkage being adapted in an over-center position to effect locked engagement of said second friction clutch assembly; and means for effecting adjustment of said abutment means in axial directions to different positions relative to said cam means, said adjusting means being positioned between said cam means and the friction members of said second clutch assembly, said abutment means being adapted in one of its aforesaid positions to render said over-center coupling inactive to operate said second clutch assembly.

13. A multiple friction clutch arrangement as defined in claim 12 wherein the axial arm of the cam means extends across the abutment means radially outwardly therefrom.

RAYMOND A. CARLSON.

REFERENCES CITED

The following references are of record in the file of this patent:

UNITED STATES PATENTS

| Number | Name | Date |
| --- | --- | --- |
| 2,129,361 | Rusenberg et al. | Sept. 6, 1938 |
| 2,168,960 | Morris | Aug. 8, 1939 |
| 2,237,322 | West | Apr. 8, 1941 |
| 2,366,643 | Nutt | Jan. 2, 1945 |
| 2,406,414 | Thelander | Aug. 27, 1946 |
| 2,507,002 | Foster et al. | May 9, 1950 |